United States Patent [19]

Daley

[11] Patent Number: 4,771,237
[45] Date of Patent: Sep. 13, 1988

[54] METHOD AND APPARATUS FOR CALIBRATING A DISPLACEMENT PROBE USING A POLYNOMIAL EQUATION TO GENERATE A DISPLACEMENT LOOK-UP TABLE

[75] Inventor: Clifton G. Daley, Toledo, Ohio

[73] Assignee: Panametrics, Waltham, Mass.

[21] Appl. No.: 831,745

[22] Filed: Feb. 19, 1986

[51] Int. Cl.$^4$ .............................................. G01R 35/00
[52] U.S. Cl. ..................................... 324/202; 73/1 J
[58] Field of Search ................. 324/202, 207; 73/1 J, 73/1 R; 364/571, 573

[56] References Cited

U.S. PATENT DOCUMENTS

| | | | |
|---|---|---|---|
| 3,740,998 | 6/1973 | Akulov | 324/202 |
| 4,303,984 | 12/1981 | Houvig | 364/571 |
| 4,510,577 | 4/1985 | Tsujii et al. | 73/1 J |
| 4,669,052 | 5/1987 | Bianco | 73/1 R |

Primary Examiner—Reinhard J. Eisenzopf
Assistant Examiner—Walter E. Snow
Attorney, Agent, or Firm—Barnes, Kisselle, Raisch, Choate, Whittemore & Hulbert

[57] ABSTRACT

A method and apparatus for calibrating a displacement probe, such as a Hall effect displacement probe, wherein a preassembled probe is clamped in a calibration fixture which includes a calibration target and facility for selectively varying displacement between the target and the probe measurement tip. Probe output is read and stored at each of a plurality of preselected target/probe displacements. The stored output v. displacement data set is then employed to generate a polynomial equation which approximates probe output as a function of displacement. A displacement v. output look-up table unique to that probe is then generated from the polynomial approximation for a multiplicity of discrete displacement increments.

2 Claims, 2 Drawing Sheets

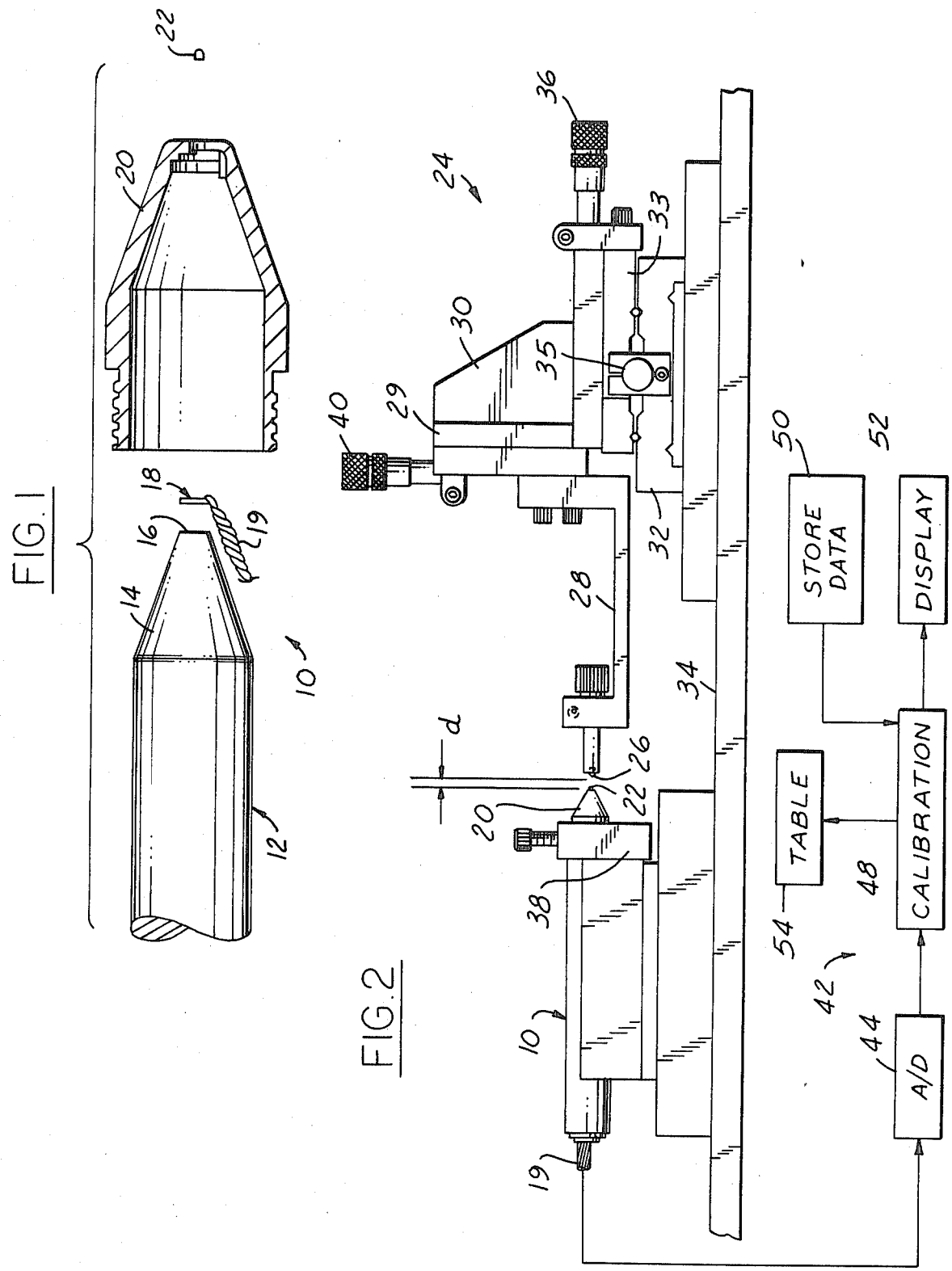

METHOD AND APPARATUS FOR CALIBRATING A DISPLACEMENT PROBE USING A POLYNOMIAL EQUATION TO GENERATE A DISPLACEMENT LOOK-UP TABLE

The present invention relates to a method and apparatus for calibrating a probe for measuring displacement between the probe measurement tip and a target object, and more particularly to calibration of a probe of the described character which embodies a Hall effect device.

BACKGROUND AND OBJECTS OF THE INVENTION

It is conventional in the art of displacement measurement to employ a probe which provides an output that varies as a function of distance or displacement between the probe measurement tip and a target object. One type of displacement probe which has enjoyed substantial acceptance in the art employs a permanent magnet and a so-called Hall effect device for measuring distance to the target object as a function of variations in the magnetic field through the Hall device. Where such probes are employed in high speed applications, it is conventional practice to provide a lookup table which relates probe output to probe/target displacement and thus provides rapid measurement without requiring complex mathematical calculations. Such tables are typically generated to reflect average characteristics of the type or model of probe in question, and thus does not accurately reflect individual measurement characteristics of each probe. Consequently, accuracy of measurement is compromised.

A general object of the present invention is to provide a method of calibrating a displacement probe, such as a Hall effect displacement probe, which generates a look-up table unique to each probe and which thus enables more accurate displacement measurements during probe operation.

Another object of the invention is to provide a method of the described character which is economical to implement and which may be performed by relatively unskilled personnel.

A further object of the invention is to provide apparatus for calibrating displacement probes in accordance with the method of the invention.

SUMMARY OF THE INVENTION

In accordance with the method of the present invention, a preassembled displacement probe to be calibrated is fixtured in a calibration fixture which includes a calibration target and means for selectively varying displacement of the target with respect to the probe. Probe output is read and stored at each of a plurality of preselected target/probe displacements. Employing the stored outputs and the corresponding preselected target/probe displacements, a polynomial equation is then generated which best relates or approximates probe output to displacement over the entire probe measurement range. A look-up table unique to the probe is then generated and stored, employing the polynomial equation, at a multiplicity of preselected increments of target/probe displacement. For enhanced fit of the generated polynomial equation to the probe output characteristics, and for resulting enhanced accuracy and resolution of the look-up table, the overall probe measurement range may be divided into a plurality of sub-ranges or regions, and differing polynomial equations and look-up tables may be sequentially generated within each of the displacement regions.

Calibration apparatus in accordance with the invention includes facility for fixturing a displacement probe to be calibrated with the probe measurement tip adjacent to a measurement target, and for selectively varying displacement between the probe tip and target. Calibration electronics receives the probe output through an a/d converter, and store such output at each of a plurality of predetermined displacements between the probe tip and target to develop a set of output data points corresponding to the plurality of predetermined displacements. The calibration electronics includes facility for generating the polynomial equation from the stored data points, and for generating a look-up table unique to the calibrated probe and relating probe output to displacement at a multiplicity of displacement increments.

A gage is provided for setting the plurality of predetermined displacements between the probe tip and the target in the field. In the preferred embodiment of the invention, the calibration gage has a pair of parallel surfaces, one of which is planar and the other of which is stepped, with distance between the surfaces at each step corresponding to one of the plurality of predetermined calibration displacements. Thus, the probe may be recalibrated by the end user at the same predetermined displacements, and thereby accommodate drift of the probe characteristics.

BRIEF DESCRIPTION OF THE DRAWINGS

The invention, together with additional objects, features and advantages thereof, will be best understood from the following description, the appended claims and the accompanying drawings in which:

FIG. 1 is a fragmentary exploded partially sectioned elevational view of a typical conventional measurement probe which may be calibrated in accordance with the present invention;

FIG. 2 is a partially schematic elevational view of calibration apparatus in accordance with a preferred embodiment of the invention;

DETAILED DISCUSSION

Figure 3:
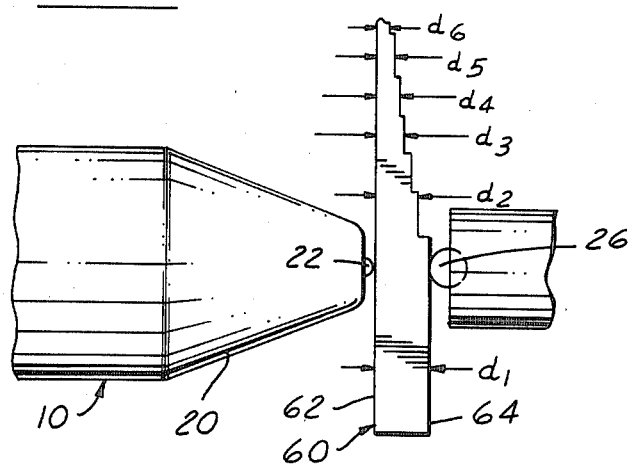
FIG. 3 is a fragmentary elevational view on an enlarged scale of a gage which may be employed for recalibrating the probe.

FIG. 1 illustrates a typical Hall effect displacement probe assembly 10 as comprising a permanent magnet 12 having a conical end 14 for concentrating magnetic flux orthogonally to a planar end surface 16. Magnet end 14 and a Hall effect transducer 18 are sandwiched within a nonmagnetic sheath 20. A probe tip 22 of magnetically permeable material is received within sheath 20 adjacent to Hall effect transducer 18. Magnetic flux from magnet 12 is thus concentrated and channeled by magnet end 14 through Hall effect transducer 18 and tip 22. In general, intensity of such magnetic flux varies as a function of distance between probe tip 22 and a target of ferromagnetic material adjacent to the probe tip, which variation is sensed by transducer 18 for providing a displacement output signal on conductors 19.

FIG. 2 illustrates calibration apparatus 24 in accordance with a presently preferred embodiment of the invention as including a ferromagnetic target object 26, such as a steel ball, cantilevered from a support 30 by an arm 28 and a vertically positionable bearing way 29. Support 30 is mounted on a fixed base 34 by a double bearing way 32,33. Each bearing way 32,33 has an associated lead screw 35,36 for manually horizontally positioning support 30 with respect to base 34. A clamp 38 is constructed to receive and firmly hold a preassembled probe 10 to be calibrated, with probe tip 22 adjacent to target ball 26. Distance d between probe tip 22 and target ball 26 may thus be varied by lead screw 36. Axial alignment of target ball 26 with respect to probe tip 22 and the axis of probe 10 may be adjusted by the screws 35,40. Most preferably, the entirety of fixture 24, with the exception of target ball 26, is constructed of non-magnetic material. Calibration electronics 42 in accordance with the present invention includes an a/d converter 44 which receives the analog output of probe 10 through conductors 19. The digital output of a/d converter 44 is connected to the calibration circuitry 48, which preferably comprises a suitably programmed digital microprocessor. Calibration circuitry 48 receives an input from an operator pushbutton or the like 50 for controlling storage and processing of probe output data, and provides an probe output data signal to a digital display 52. Calibration circuitry 48 is also connected to a suitable non-volatile memory 54 for storing a displacement v. output look-up table unique to probe 10.

In accordance with the present invention, it has been found that output of probe 10 may be accurately approximated by the following polynomial equation:

$$\hat{p} = a_0 + a_1 d + a_2 d^2 + \cdots + a_n d^n \qquad (1)$$

where $a_0, a_1, \ldots, a_n$ are polynomial coefficients, d is probe/target displacement and n is an integer. For m discrete calibration points, the corresponding probe outputs can be written in vector form as:

$$P = [p_1 p_2 p_3 \cdots p_m] \qquad (2)$$

Polynomial equation (1) can be used to obtain:

$$\hat{P} = A \cdot D \qquad (3)$$

where $$A = [a_0 a_1 a_2 \cdots a_n] \qquad (4)$$

$$D = \begin{bmatrix} 1 & 1 & 1 & \cdots & 1 \\ d_1 & d_2 & d_3 & \cdots & d_m \\ d_1^2 & d_2^2 & d_3^2 & \cdots & d_m^2 \\ \vdots & \vdots & \vdots & & \vdots \\ d_1^n & d_2^n & d_3^n & \cdots & d_m^n \end{bmatrix} \qquad (5)$$

and where $d_1, d_2$, etc. are probe/target displacements d (FIG. 2) corresponding to probe outputs $p_1, p_2$, etc. With m equal to or greater than n+1, there is a unique minimum mean square polynomial approximation with coefficients given by:

$$A = P \cdot C \qquad (6)$$

where:

$$C = [D' \cdot (D \cdot D')^{-1}] \qquad (7)$$

with D' being the transpose of matrix D, and the superscript $-1$ denoting matrix inversion.

Figure 4:
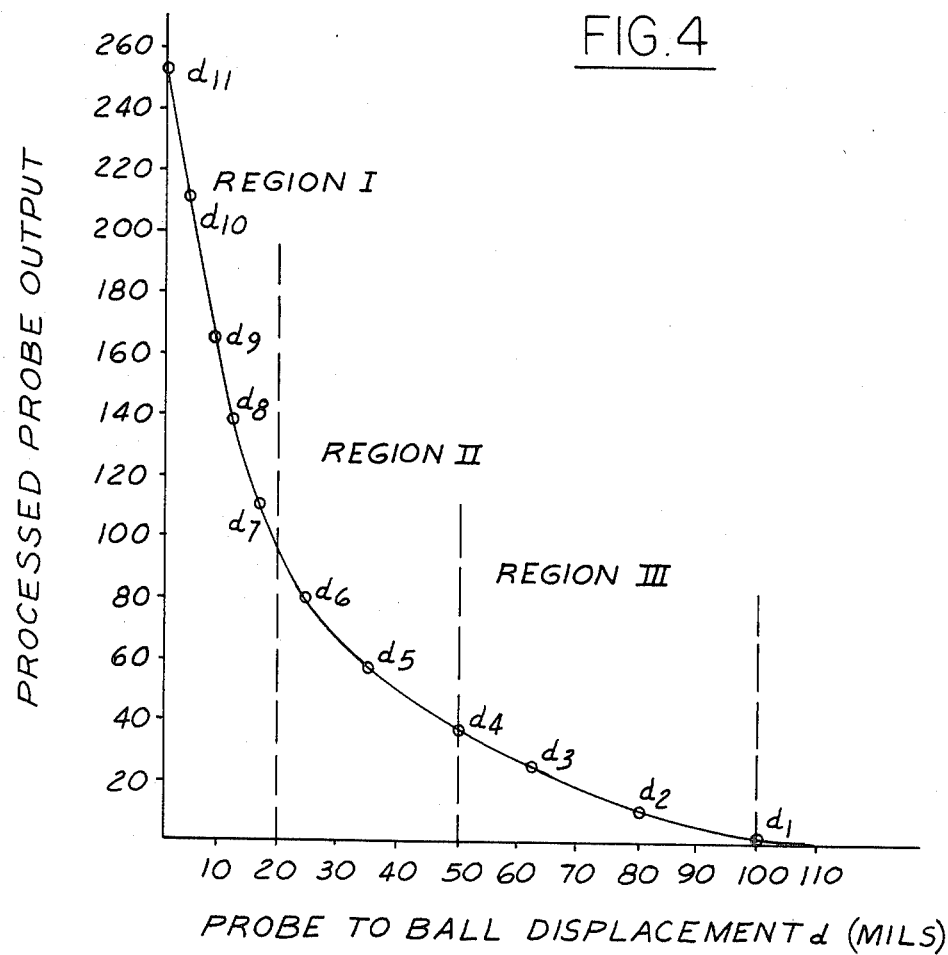
FIG. 4 is a graphic illustration useful in discussing operation of the invention.

In accordance with the present invention, a probe 10 to be calibrated is first clamped within fixture 24, and displacement d between probe tip 22 and target ball 26 is varied among a plurality of target/probe displacements $d_1, d_2, \ldots d_m$. At each such calibration displacement $d_1, d_2$, etc., the corresponding output $p_1, p_2$, etc. of probe 10 is read and stored within calibration circuitry 48 under control of data storage switch 50. FIG. 4 graphically illustrates processed probe output, as indicated at display 52, as a function of displacement d. The curve of FIG. 4 represents least squares best fit to stored data points. Specific calibration displacements are then selected, in this example $d_1$ through $d_{11}$. The end points $d_1$ and $d_{11}$ are selected to correspond to the end points of the desired calibration range, in this case one hundred mils and zero mils respectively.

Each subsequent probe of this design will possess a characteristic curve generally of the contour shown in FIG. 4, so that it is only necessary in accordance with the invention to calibrate at preselected data points $d_1$ through $d_{11}$. This is preferably accomplished employing a displacement gage 60 illustrated in FIG. 3 as comprising a flat plate having a pair of opposed parallel surfaces 62,64. Gage plate surface 62 is planar while plate surface 64 is stepped, with the distance between surfaces 62,64 at each step corresponding to a preselected target/probe displacement $d_1, d_2$, etc. Thus, employing gage 60, distance between probe measurement tip 22 and target ball 26 may be accurately set at each of the predetermined calibration displacements $d_1, d_2$, etc. With displacements $d_1$ through $d_{11}$ and corresponding probe outputs $p_1$ through $p_{11}$ thus obtained, constants $a_0$ through $a_n$ are calculated within calibration circuitry 48 per matrix and vector equations (3)-(7). A look-up table unique to each probe 10 is then generated within circuitry 48 and stored within memory 54 employing polynomial equation (1) over the entire calibration range at preselected desired increments of displacement. This table may be burned into a read-only-memory, for example, and remain associated with the corresponding probe 10 throughout the useful life of the probe. Alternatively, where probe 10 is to be employed in an automated production environment, for example, the look-up table may be stored in a central processor together with the probe serial number or other identifying indicia.

Resolution of the look-up table depends, of course, upon the number of increments employed and the calibration range. The number of table displacement increments is, in turn, limited by the capabilities of a/d converter 44 and calibration circuitry 48. With a twelve bit a/d converter, it is theoretically possible to employ $2^{12}$ or 4096 displacement increments, yielding a resolution of better than 2.59% over a 100 mil measurement range. (It will be appreciated, of course, that the 100 mil range herein discussed is strictly by way of example.)

To minimize calibration time and expense, the number of data points m and the order n of polynomial equation (1) are selected to be as low as possible consistent with desired resolution of measurement probe 10. To increase accuracy of the polynomial approximation over an extended measurement range, it is desirable in many instances to divide the overall range into a plurality of subranges or regions, such as regions I, II and III illustrated in FIG. 4. The steps of reading probe outputs $p_1$ through $p_m$ at corresponding displacements $d_1$ through $d_m$, generating the polynomial approximation and forming the look-up table are then sequentially performed for displacements d within each of the regions so as to generate a composite look-up table which encompasses the entire measurement range.

The invention has been described in detail in connection with calibration of Hall effect displacement probes. However, the principles of the invention are not limited to probes of this character. Rather, the invention may be employed in calibration of any displacement probe having a monotonic output characteristic which may be accurately approximated by polynomial equation (1).

An important advantage of the invention lies in the fact that the displacement probes may be readily recalibrated at any time by the end user employing the gage 60. Thus, probe drift due to age or temperature, etc. may be readily accommodated.

A complete program listing for performing the foregoing calibration technique on an Intel 8751H microprocessor is included herewith and incorporated herein as an Appendix.

The invention claimed is:

1. A method of individually calibrating a displacement probe, such as a Hall effect displacement probe, having a monotonic output characteristic over a predetermined displacement range comprising the steps of:
   (a) fixturing a probe in a calibration fixture which includes a calibration target and means for selectively varying displacement d between said target and said probe,
   (b) reading output $p_1, p_2 \ldots p_m$ of said probe at each of a plurality of preselected target/probe displacements $d_1, d_2, \ldots d_m$ within said range,
   (c) generating constants $a_0, a_1, \ldots a_n$ according to the equation:

$$A = P \cdot C$$

where $$A = [a_0 a_1 a_2 \cdots a_n]$$

$$P = [p_1 p_2 p_3 \cdots p_m]$$

$$C = [D' \cdot (D \cdot D')^{-1}]$$

$$D = \begin{bmatrix} 1 & 1 & 1 & \ldots & 1 \\ d_1 & d_2 & d_3 & \ldots & d_m \\ d_1^2 & d_2^2 & d_3^2 & \ldots & d_m^2 \\ d_1^n & d_2^n & d_3^n & \ldots & d_m^n \end{bmatrix}$$

D' is the transpose of matrix D, the superscript $-1$ denotes matrix inversion, and n and m are integers with m being greater than or equal to $n+1$ and
   (d) generating a look-up table unique to said probe relating probe output P to displacement d over said range according to the equation:

$$\hat{p} = a_0 + a_1 d + a_2 d^2 + \cdots + a_n d^n.$$

2. The method set forth in claim 1 comprising the additional steps of:
   (e) dividing said predetermined displacement range into a plurality of regions, and
   (f) performing said steps (b) through (d) sequentially for displacements d within each of said regions.

* * * * *